(12) United States Patent
Lee et al.

(10) Patent No.: US 11,515,816 B2
(45) Date of Patent: Nov. 29, 2022

(54) APPARATUS FOR DETECTING ROTATION OF MOTOR

(71) Applicant: HYUNDAI TRANSYS INC., Chungcheongnam-do (KR)

(72) Inventors: Ho Cheoul Lee, Gyeonggi-do (KR); Jong In Shin, Gyeonggi-do (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 0 days.

(21) Appl. No.: 17/401,614

(22) Filed: Aug. 13, 2021

(65) Prior Publication Data
US 2022/0069750 A1  Mar. 3, 2022

(30) Foreign Application Priority Data

Sep. 3, 2020  (KR) .......................... 10-2020-0112117

(51) Int. Cl.
H02P 7/00  (2016.01)
(52) U.S. Cl.
CPC .................................. *H02P 7/0094* (2013.01)
(58) Field of Classification Search
CPC .................................................. H02P 7/0094
See application file for complete search history.

(56) References Cited

U.S. PATENT DOCUMENTS

2017/0093149 A1*  3/2017  Liu .......................... H02H 7/09

FOREIGN PATENT DOCUMENTS

| JP | 2012-195994 A | 10/2012 |
| KR | 1020080090192 A | 10/2008 |
| KR | 20160082888 | * 7/2016 |

OTHER PUBLICATIONS

Translation of KR20160082888 has been attached.*

* cited by examiner

*Primary Examiner* — Zoheb S Imtiaz (57) ABSTRACT

Disclosed is an apparatus for detecting rotation of a motor, including a first switching device and a second switching device that are connected to a power supply, a third switching device and a fourth switching device that are connected to a ground, a motor connected between a first node to which the first switching device and the third switching device are connected and a second node to which the second switching device and the fourth switching device are connected, a first resistor device and a second resistor device that are disposed between the third switching device and the ground and between the fourth switching device and the ground, respectively, and a controller configured to derive a rotation amount of the motor through integration of current flowing in the first resistor device or the second resistor device by counter-electromotive force generated when the motor brakes.

10 Claims, 8 Drawing Sheets

APPARATUS FOR DETECTING ROTATION OF MOTOR

This application claims the benefit of Korean Patent Application No. 10-2020-0112117, filed on Sep. 3, 2020, the entireties of which are hereby incorporated herein by reference.

BACKGROUND

(a) Technical Field

The present disclosure relates to an apparatus for detecting rotation of a motor for generating a pulse for detecting rotation of the motor without a Hall sensor.

(b) Background Art

A stator of a motor applied to a seat uses an armature formed by allowing current to flow in a coil, and a rotor employs a permanent magnet in which N and S poles are repeatedly formed. In order to continuously rotate the motor, it is necessary to form a continuous rotating magnetic field of the motor, and in order to form the continuous rotating magnetic field, current flowing in a coil of each phase of the armature needs to be converted at an appropriate time. In this case, it is necessary to accurately recognize the position of the rotor in order to recognize the conversion time.

In particular, in order to smoothly drive the motor, it is necessary to precisely match the position of the rotor and the conversion time of phase current, and to this end, a Hall sensor for detecting the position of the rotor is applied to an internal side of the motor. Due to global price competition, a method of reducing costs by removing a Hall sensor from a memory seat has been studied. Such a technology is referred to as a sensor-less motor control technology and a core technology thereof is interpretation of current ripple generated while the motor is rotated. A low-frequency component due to components of winding resistance and counter-electromotive force and a high-frequency component due to rotation of a commutator are synthesized in current of the motor, and accordingly it is not easy to discern an inflection point of the ripple.

After power is supplied to the motor, the ripple is stably generated in a stability state. In this case, when an increment in the ripple is calculated, positive and negative values are repeatedly output based on 0, thereby generating zero crossing. When zero crossing is used, it is easy to calculate rotation of the motor. However, the ripple of the current generated after the motor brakes is unsafe, and even if the increment in the ripple is calculated, it is difficult to accurately determine whether the increment has a positive value or a negative value, and accordingly, there is a problem in that it is difficult to determine rotation of the motor.

SUMMARY OF THE INVENTION

In one aspect, the present disclosure provides an apparatus for detecting rotation of a motor for determining a rotation amount of the motor using counter-electromotive force generated after the motor brakes without a Hall sensor.

In another aspect, the present disclosure provides an apparatus for detecting rotation of a motor for correcting a section in which a pulse is not capable of being generated due to a small amount of current based on counter-electromotive force immediately after the motor brakes, based on a cycle of pulses generated before the motor brakes.

An embodiment of the present disclosure provides an apparatus for detecting rotation of a motor. The apparatus may include a first switching device and a second switching device that are connected to a power supply, a third switching device and a fourth switching device that are connected to a ground, a motor connected between a first node to which the first switching device and the third switching device are connected and a second node to which the second switching device and the fourth switching device are connected, a first resistor device and a second resistor device that are disposed between the third switching device and the ground and between the fourth switching device and the ground, respectively, and a controller configured to derive a rotation amount of the motor through integration of current flowing in the first resistor device or the second resistor device by counter-electromotive force generated when the motor brakes, and to generate a pulse based on the rotation amount of the motor.

In one aspect, current may flow in the second resistor device when the motor rotates in a forward direction, current may flow in the first resistor device when the motor rotates in a reverse direction, when the motor brakes while rotating in the forward direction, the controller may generate the pulse based on the current flowing in the first resistor device, and when the motor brakes while rotating in the reverse direction, the controller may generate the pulse based on the current flowing in the second resistor device.

In another aspect, the controller may detect rotation of the motor until the motor brakes based on a slope of ripple of the current flowing in the first resistor device or the second resistor device.

The controller may correct omission of a pulse generated until an integrated value of the current flowing in the first resistor device or the second resistor device, accumulated from a time at which the motor brakes, is equal to or greater than an initial threshold.

The controller may generate the omitted pulse based on an average of cycles of pulses until the motor brakes.

The controller may generate an edge of the pulse at a time at which a cumulative value of integrated current value obtained through integration of current is equal to or greater than an initial threshold.

The controller may set a value obtained by adding a preset range value to the initial threshold after the cumulative value of the integrated current value is greater than the initial threshold, to a primary threshold, and the controller may generate an edge of the pulse at a time at which the cumulative value of the integrated current value is equal to or greater than the primary threshold after the edge of the pulse is generated.

The controller may set a value obtained by adding the range value to the primary threshold, to a secondary threshold after the edge of the pulse is generated, and may generate the edge of the pulse by comparing the secondary threshold with the cumulative value of the integrated current value, and the controller may generate the edge of the pulse by comparing a new threshold that is continuously updated with the cumulative value of the integrated current value.

The controller may include a current measurer configured to measure the current flowing in the first resistor device or the second resistor device, an integral unit configured to derive the rotation amount of the motor, which is proportional to an integrated current value obtained through integration of the measured current, a correction logic generator configured to correct omission of a pulse generated until a cumulative value of the integrated current value is equal to or greater than an initial threshold from a time at which the motor brakes, and a pulse generator configured to generate the pulse by comparing the cumulative value of the integrated current value with an $N^{th}$ threshold.

The pulse generator may set a value obtained by adding a preset range value to an $(N-1)^{th}$ threshold, to an $N^{th}$ threshold, and may generate a new edge of the pulse at a time at which the integrated current value accumulated after the edge of the pulse is generated is equal to or greater than the $N^{th}$ threshold.

The current measurer may derive a rotation direction before the motor brakes based on a resistor device in which current flows among the first resistor device and the second resistor device.

BRIEF DESCRIPTION OF THE DRAWINGS

The above and other features of the present disclosure will now be described in detail with reference to certain exemplary embodiments thereof illustrated in the accompanying drawings which are given herein below by way of illustration only, and thus are not limitative of the present disclosure, and wherein.

DETAILED DESCRIPTION

The attached drawings for illustrating exemplary embodiments of the present disclosure are to be referred to in order to gain a sufficient understanding of the present disclosure, the merits thereof, and the objectives accomplished by the implementation of the present disclosure. The present disclosure may, however, be embodied in many different forms, and should not be construed as being limited to the embodiments set forth herein; rather, these embodiments are provided so that this disclosure will be thorough and complete, and will fully convey the concept of the present disclosure to one of ordinary skill in the art. Meanwhile, the terminology used herein is for the purpose of describing particular embodiments and is not intended to limit the present disclosure. Like reference numerals in the drawings denote like elements.

Terms such as 'unit' or 'module', etc., should be understood to indicate units that process at least one function or operation and that may be embodied in a hardware manner, a software manner, or a combination of a hardware manner and a software manner.

Terms, such as "first", "second", and the like used in the specification may be used to distinguish the relevant elements using the reference relationship, and are not limited by the order.

The detailed description is used to exemplify the present disclosure. The description herein is given to show exemplary embodiments of the present disclosure, and the present disclosure may be used in various other combinations, changes, and environments. That is, the present disclosure may be changed or modified within the scope of the concept of the present disclosure disclosed in the specification, the equivalent scope of the given disclosure, and/or the scope of the technology or knowledge in the art. The described embodiment is the ideal embodiment for implementing the technological spirit of the present disclosure, but may be changed in various forms required in detailed applications and use of the present disclosure. Thus, the detailed description of the present disclosure herein is merely exemplary, and is not intended to limit the present disclosure. The following claims are to be interpreted as including other embodiments.

Figure 1:
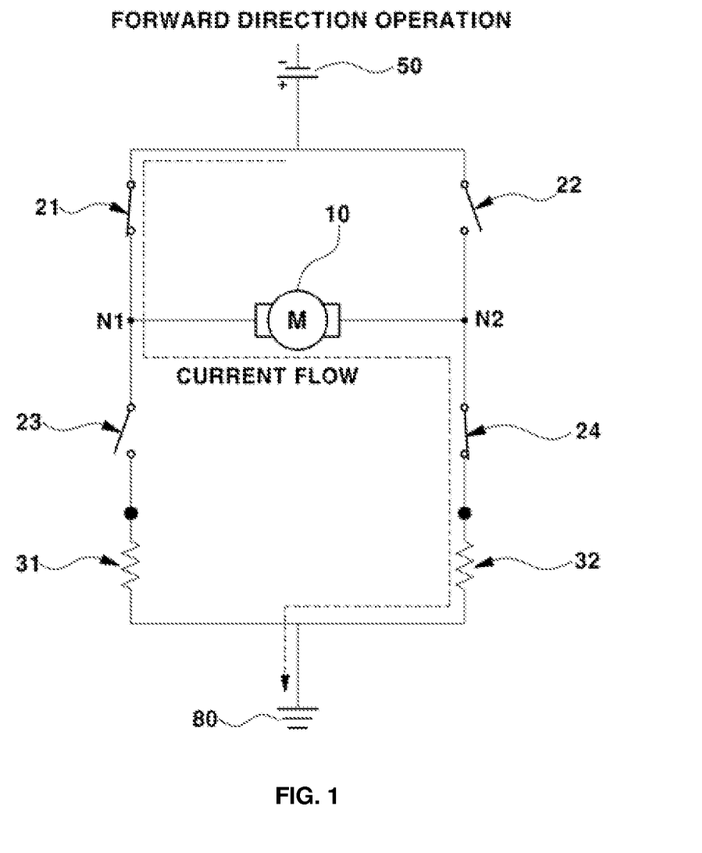
FIG. 1 is a circuit diagram for explaining measurement of current generated when a motor rotates in a forward direction by an apparatus for detecting rotation of the motor according to an embodiment of the present disclosure.
Figure 2:
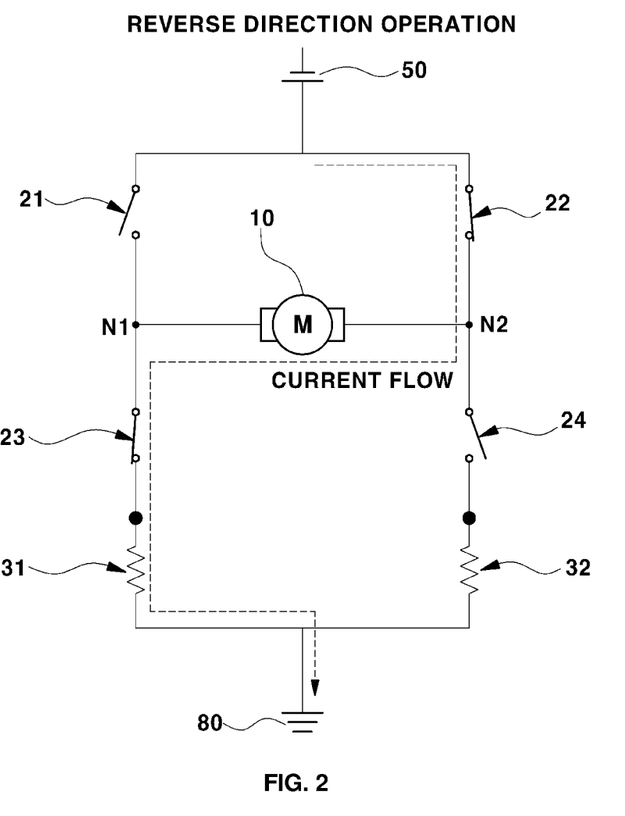
FIG. 2 is a circuit diagram for explaining measurement of current generated when a motor rotates in a reverse direction by an apparatus for detecting rotation of the motor according to an embodiment of the present disclosure.

FIG. 1 is a circuit diagram for explaining measurement of current generated when a motor rotates in a forward direction by an apparatus for detecting rotation of the motor according to an embodiment of the present disclosure. FIG. 2 is a circuit diagram for explaining measurement of current generated when a motor rotates in a reverse direction by an apparatus for detecting rotation of the motor according to an embodiment of the present disclosure.

Referring to FIGS. 1 and 2, the apparatus for detecting rotation of the motor may be an apparatus for replacing a Hall sensor applied to an internal side of the motor in order to calculate the position of the motor (a rotation angle or a track position) of a memory seat. The apparatus for detecting rotation of the motor may generate a pulse to recognize the position of the motor without an original Hall sensor.

The apparatus for detecting rotation of the motor may include a motor 10, H-bridge circuits 21, 22, 23, 24, 31, and 32, and a controller (not shown). The apparatus for detecting rotation of the motor may use current flowing in resistor devices 31 and 32 applied to the H-bridge circuits 21, 22, 23, 24, 31, and 32 in order to generate a pulse. The controller (not shown) may be an electronic control unit (ECU) for controlling driving of a seat.

The H-bridge circuits 21, 22, 23, 24, 31, and 32 may include a first switching device 21 and a second switching device 22 that are connected to a power supply 50, a third switching device 23 and a fourth switching device 24 that are connected to a ground 80, a first resistor device 31 disposed between the third switching device 23 and the ground 80, and a second resistor device 32 disposed between the fourth switching device 24 and the ground 80. A point to which the first switching device 21 and the third switching device 23 are connected may be defined as a first node N1, and a point to which the second switching device 22 and the fourth switching device 24 are connected may be defined as a second node N2. The motor 10 may be disposed between the first node N1 and the second node N2, and may be connected to the first switching device 21, the second switching device 22, the third switching device 23, and the fourth switching device 24.

The motor 10 may be applied to a seat for a vehicle and may allow the motor 10 to rotate in forward and reverse directions according to switch manipulation of an occupant. According to the switch manipulation of the occupant, when the first switching device 21 and the fourth switching device 24 are turned on and the second switching device 22 and the third switching device 23 are turned off, the motor 10 may rotate in a forward direction. In this case, current may flow in the second resistor device 32, and the controller (not shown) may measure the current flowing in the second resistor device 32. When the first switching device 21 and the fourth switching device 24 are turned on, current may flow to the second resistor device 32 from the power supply 50 through the first switching device 21, the motor 10, and the fourth switching device 24.

According to the switch manipulation of the occupant, when the second switching device 22 and the third switching device 23 are turned on and the first switching device 21 and the fourth switching device 24 are turned off, the motor 10 may rotate in a reverse direction. In this case, current may flow to the first resistor device 31, and the controller (not shown) may measure current flowing in the first resistor device 31. When the second switching device 22 and the third switching device 23 are turned on, current may flow to the first resistor device 31 from the power supply 50 through the second switching device 22, the motor 10, and the third switching device 23.

The controller (not shown) may measure a resistor device in which current flows among the first resistor device 31 and the second resistor device 32 and may determine whether the motor 10 currently rotates in a forward or reverse direction.

Figure 3:
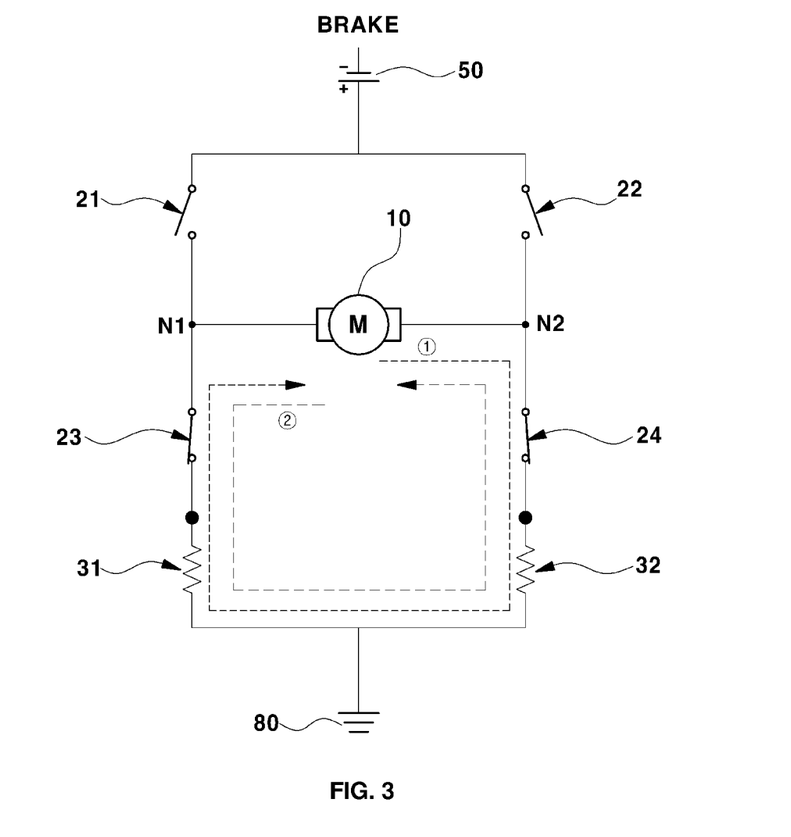
FIG. 3 is a circuit diagram for explaining measurement of current generated when a motor brakes by an apparatus for detecting rotation of the motor according to an embodiment of the present disclosure.

FIG. 3 is a circuit diagram for explaining measurement of current generated when a motor brakes by an apparatus for detecting rotation of the motor according to an embodiment of the present disclosure. For brevity of description, a repeated description will be omitted.

Referring to FIGS. 1 to 3, when the motor 10 brakes while operating in a forward direction, counter-electromotive force may be generated, and current may flow in a direction 2̂. Current may flow to the first resistor device 31 from the motor 10 through the third switching device 23, and the controller (not shown) may measure current flowing in the first resistor device 31. Accordingly, the controller (not shown) may determine that the motor 10 brakes while operating in a forward direction.

When the motor 10 brakes while operating in a reverse direction, counter-electromotive force may be generated, and current may flow in a direction 1̂. Current may flow to the second resistor device 32 from the motor 10 through the fourth switching device 24, and the controller (not shown) may measure current flowing in the second resistor device 32. Accordingly, the controller (not shown) may determine that the motor 10 brakes while operating in a reverse direction.

Figure 4:
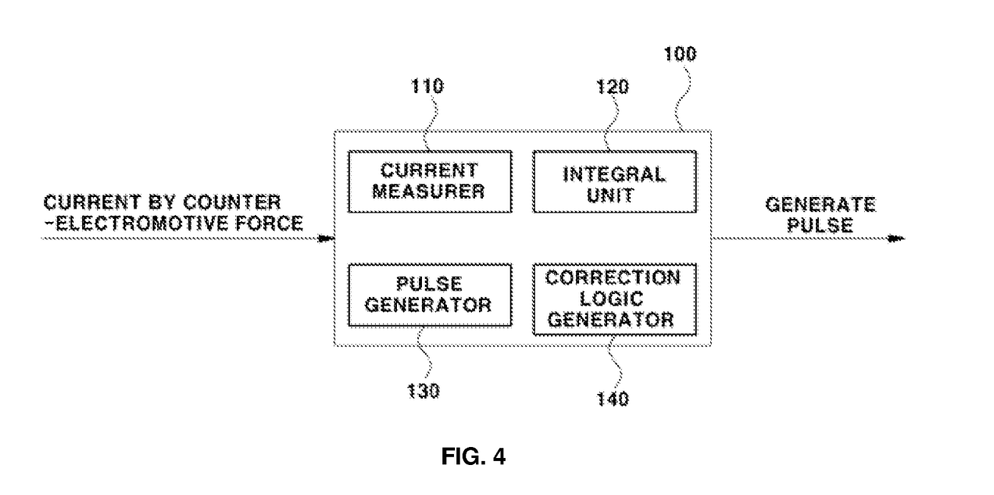
FIG. 4 is a block diagram showing a controller of an apparatus for detecting rotation of a motor according to an embodiment of the present disclosure.

FIG. 4 is a block diagram showing a controller of an apparatus for detecting rotation of a motor according to an embodiment of the present disclosure.

Referring to FIGS. 3 and 4, a controller 100 may derive a rotation amount of the motor 10 based on counter-electromotive force generated when the motor 10 brakes, and thus may generate a pulse based on the rotation amount of the motor 10. In detail, the rotation amount of the motor 10 may be derived through integration of current flowing in the first resistor device 31 or the second resistor device 32 by counter-electromotive force generated when the motor 10 brakes, and the pulse may be generated based on the rotation amount of the motor 10. When the motor 10 rotates in a forward direction, current may flow in the second resistor device 32, and when the motor 10 rotates in a reverse direction, current may flow in the first resistor device 31. When the motor 10 brakes while operating in a forward direction, the controller 100 may generate a pulse based on the current flowing in the first resistor device 31. When the motor 10 brakes while operating in a reverse direction, the controller 100 may generate the pulse based on the current flowing in the second resistor device 32. The pulse generated by the controller 100 may be similar to a pulse generated by a Hall sensor, and thus the controller 100 according to an embodiment of the present disclosure may generate a pulse for determining the rotation amount of the motor 10 even if there is no Hall sensor. The controller 100 may determine the rotation amount of the motor based on the current generated by counter-electromotive force after determining whether the motor 10 is operated in a forward or reverse direction before braking.

The controller 100 may include a current measurer 110, an integral unit 120, a pulse generator 130, and a correction logic generator 140. The current measurer 110, the integral unit 120, the pulse generator 130, and the correction logic generator 140 may be configured by classifying the controller 100 depending on the functions thereof and may not be physical components of the controller 100.

The current measurer 110 may measure current flowing in the first resistor device 31 or the second resistor device 32. The current measurer 110 may recognize a direction in which the motor 10 rotates before braking based on a resistor device in which current flows among the first resistor device 31 and the second resistor device 32.

The integral unit 120 may integrate the current measured by the current measurer 110. The motor 10 may be operated using the following equation.

$$V_{in} = R_i + \frac{L \cdot di}{dt} + e \quad e = K_e W$$

Here, $V_{in}$ is a voltage applied to the motor 10, i is current, $R_i$ is resistance, L is inductance, e is counter-electromotive force, $K_e$ is a counter-electromotive force constant, and W is a rotation speed of a motor.

The voltage applied to the motor 10 when the motor 10 brakes may be 0, and the current i when the motor 10 brakes may be current $i_e$ generated by counter-electromotive force.

$$0 = R \cdot i_e + \frac{L \cdot di_e}{dt} + e$$

In this case, a voltage generated by an inductor may be disregarded. The current $i_e$ when the motor 10 brakes may be proportional to the rotation speed of the motor 10, and the rotation amount of the motor 10, which is obtained through integration of the rotation speed of the motor 10, may be derived through integration of the current $i_e$.

$$i_e = \frac{-e}{R} = \frac{-K_e W}{R}$$

Then, a current value obtained through integration by the integral unit 120 may be defined as an integrated current value $i_e$.

The pulse generator 130 may generate a pulse by comparing a cumulative value of the integrated current value $i_e$ when the motor 10 brakes, which is proportional to the rotation amount of the motor 10, with a threshold. The pulse generator 130 may compare the cumulative value of the integrated current value $i_e$ with the threshold and may generate the pulse at the time at which the cumulative value of the integrated current value $i_e$ is equal to or greater than the threshold. The threshold may refer to an experimentally derived value. In detail, the pulse generator 130 may generate an edge of the pulse at the time at which the cumulative value of the integrated current value $i_e$ is equal to or greater than an initial threshold. Immediately after the motor 10 brakes, the cumulative value of the integrated current value $i_e$ is excessively small, and thus when the cumulative value of the integrated current value $i_e$ is smaller than the initial threshold, the pulse generator 130 may have difficulty in generating the pulse. Accordingly, the pulse generator 130 may generate the pulse from the time at which the cumulative value of the integrated current value $i_e$ is equal to or greater than the initial threshold.

The pulse generator 130 may set a value obtained by adding a preset range value to the initial threshold after the time at which the cumulative value of the integrated current value $i_e$ is greater than the initial threshold, to a primary threshold. The preset range value may be derived based on a current value applied to the motor 10 for allowing a Hall sensor to generate 1 pulse when rotation of the motor 10 is measured. That is, the preset range value may refer to an experimentally derived constant. The pulse generator 130 may continuously update the threshold in order to continuously generate pulses. The pulse generator 130 may generate the pulse by comparing the cumulative value of the integrated current value $i_e$, which is proportional to the rotation amount of the motor 10, with an $(N-1)^{th}$ threshold. The pulse generator 130 may generate an $N^{th}$ edge at the time at which the cumulative value of the integrated current value $i_e$ is equal to or greater than the $(N-1)^{th}$ threshold. After the $N^{th}$ edge is generated, the pulse generator 130 may set the $N^{th}$ threshold by adding the preset range value to the $(N-1)^{th}$ threshold. The pulse generator 130 may generate an $(N+1)^{th}$ edge of the pulse at the time at which the integrated current value $i_e$ accumulated after the $N^{th}$ edge of the pulse is generated is equal to or greater than the $N^{th}$ threshold. The pulse generator 130 may continue to update a threshold and to generate an edge of the pulse through the aforementioned procedure until the counter-electromotive force of the motor 10 is 0.

The correction logic generator 140 may correct omission of a pulse generated until the integrated current value $i_e$ accumulated from the time at which the motor 10 brakes is equal to or greater than the initial threshold. Immediately after the motor 10 brakes, current generated by counter-electromotive force may be excessively small. Thus, the pulse generator 130 may not generate a pulse when the cumulative value of the integrated current value $i_e$ is excessively small. The correction logic generator 140 may generate the omitted pulse based on an average of cycles of pulses derived until the motor 10 brakes. Until the motor 10 brakes, the controller 100 may determine rotation of the motor 10 based on a change in a slope of ripple of current flowing in the first resistor device 31 or the second resistor device 32. That is, the controller 100 may set the slope of the current ripple when power is applied to the motor 10 to 0 and may generate a pulse according to whether the slope of the current ripple has a positive value or a negative value based on 0. Accordingly, the correction logic generator 140 may generate the omitted pulse using the average of the pulses generated until the motor 10 brakes.

According to an embodiment of the present disclosure, the controller 100 of the apparatus for detecting rotation of the motor may generate a pulse based on an integrated current value after the motor 10 brakes without a Hall sensor. The rotation amount may be derived based on the pulse generated by the controller 100, thereby reducing manufacturing costs due to omission of a Hall sensor.

According to an embodiment of the present disclosure, the apparatus for detecting rotation of the motor may correct omitted parts of the pulse generated based on the integrated current value based on the pulse derived before the motor 10 brakes. Thus, the apparatus for detecting rotation of the motor may prevent an error in determination of the rotation amount of the motor 10 due to the omitted pulse.

Figure 5:
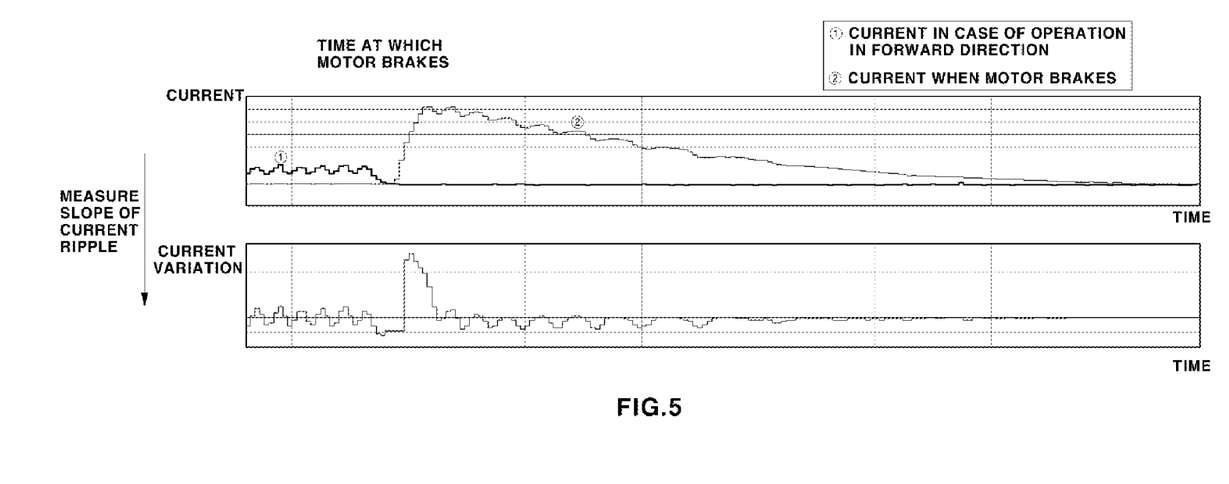
FIG. 5 is a graph for explaining a method of detecting a rotation amount of a motor until the motor brakes according to an embodiment of the present disclosure.

FIG. 5 is a graph for explaining a method of detecting a rotation amount of a motor until the motor brakes according to an embodiment of the present disclosure. FIG. 5 illustrates the case in which the motor brakes while rotating in a forward direction.

Referring to FIGS. 4 and 5, the controller 100 may generate a pulse based on a variation of current measured while the motor is operated in a forward direction. In detail, the controller 100 may set a slope of the current ripple at the time at which power is applied to the motor to 0, and may derive whether the slope of the current ripple has a positive value or a negative value based on 0 to generate the pulse.

Current may be generated by counter-electromotive force after the motor brakes, and thus the slope of the current ripple measured by the controller 100 may have a negative value. Thus, the controller 100 may not generate a pulse through the slope of the current ripple after the motor brakes, and may not determine rotation of the motor.

Figure 6:
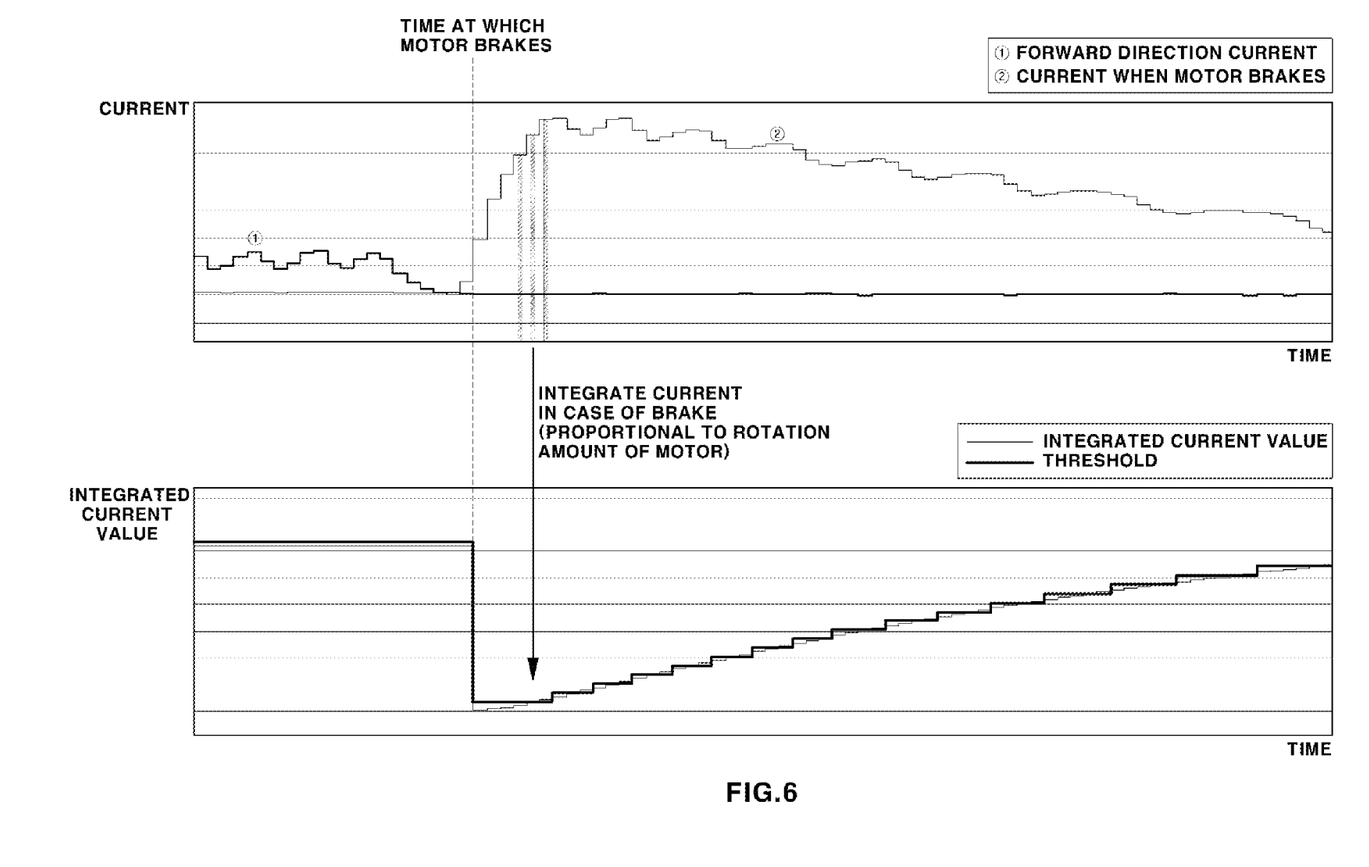
FIG. 6 is a graph showing integration of current detected after the motor brakes according to an embodiment of the present disclosure.

FIG. 6 is a graph showing integration of current detected after the motor brakes according to an embodiment of the present disclosure. FIG. 6 illustrates the case in which the motor brakes while rotating in a forward direction.

Referring to FIGS. 4 and 6, the current measurer 110 may measure current generated by counter-electromotive force after the motor brakes. The integral unit 120 may derive the rotation amount of the motor through integration of current generated by counter-electromotive force. In this case, the derived rotation amount of the motor does not have a pulse form, and thus it may be difficult to intuitively determine the rotation amount of the motor. An integrated current value that is a value obtained through integration of current may be proportional to the rotation amount of the motor, and in FIG. 6, the y axis refers to the rotation amount of the motor as well as the integrated current value.

Figure 7:
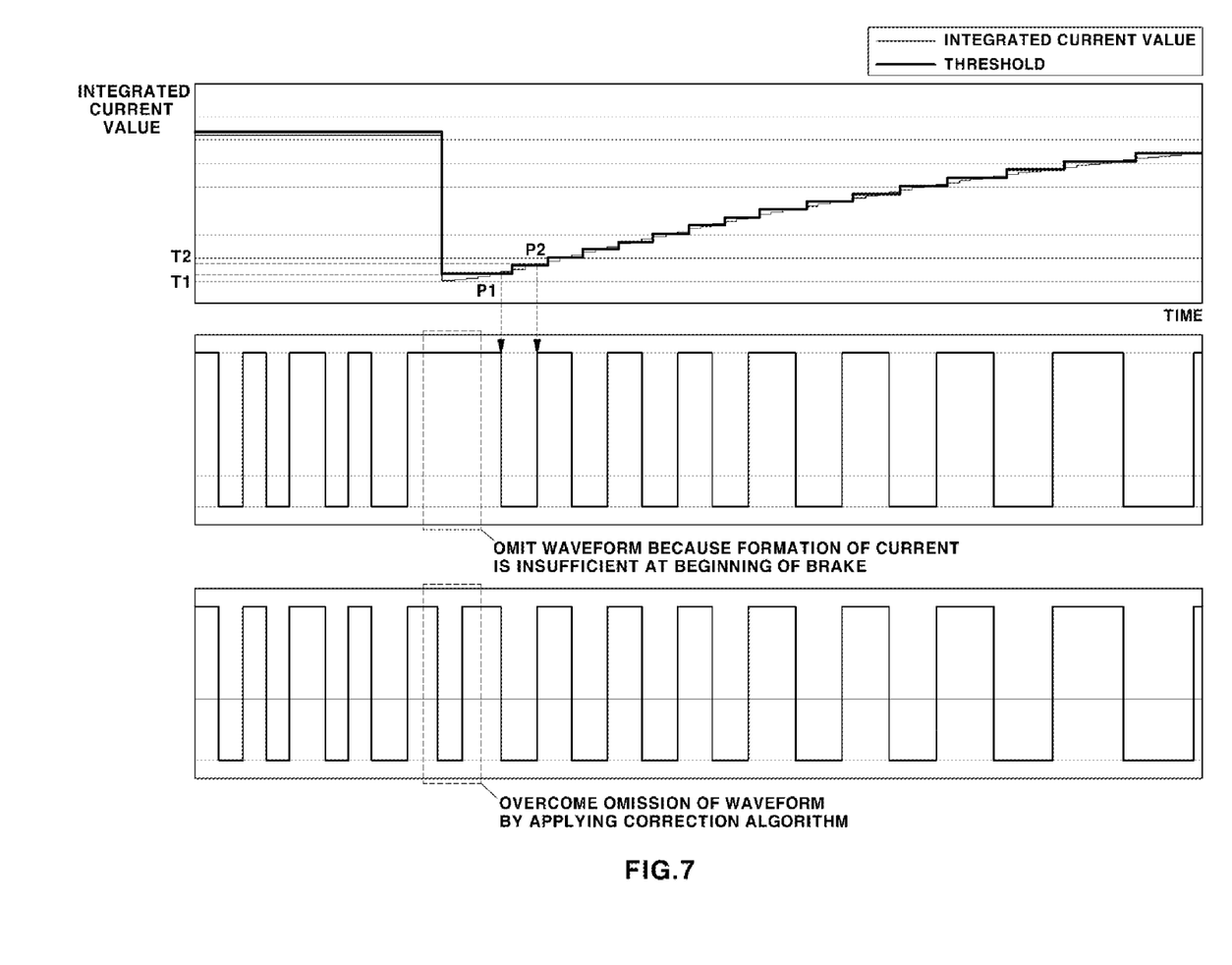
FIG. 7 is a graph for explaining generation of a pulse based on a graph showing integration of current according to an embodiment of the present disclosure.

FIG. 7 is a graph for explaining generation of a pulse based on a graph showing integration of current according to an embodiment of the present disclosure.

Referring to FIGS. 4 and 7, the pulse generator 130 may generate the pulse based on the integrated current value derived by the integral unit 120 after the time at which the motor brakes. The pulse generator 130 may generate a primary edge of the pulse at a first time P1 at which a cumulative value of the integrated current value is equal to or greater than an initial threshold T1. The pulse generator 130 may set a value obtained by adding the preset range value to the initial threshold T1 after the first time P1, to a primary threshold T2. The pulse generator 130 may determine whether the integrated current value accumulated after the first time P1 is equal to or greater than the primary threshold T2. The pulse generator 130 may generate a secondary edge of the pulse at a second time P2 at which the integrated current value accumulated after the first time P1 is equal to or greater than the primary threshold T2.

The pulse generator 130 may set a value obtained by adding the preset range value to an $(N-1)^{th}$ threshold after an $N^{th}$ edge of the pulse is generated, to an $N^{th}$ threshold. The pulse generator 130 may continuously generate pulses until the integrated current value is not equal to or greater than the $N^{th}$ threshold. A cycle of pulses generated by the pulse generator 130 may be increased until the motor is driven again after the motor brakes.

The correction logic generator 140 may correct the omitted pulse until a cumulative value of current from the time at which the motor brakes is equal to or greater than the initial threshold T1. The correction logic generator 140 may generate the omitted pulse based on the average of cycles of pulses derived until the motor brakes. Immediately after the motor brakes, a rotation speed prior to braking may be maintained for a predetermined time or may not be drastically lowered. Accordingly, the correction logic generator 140 may infer the omitted pulse based on the average of pulses derived before the motor brakes and may reduce an error in recognition of the rotation amount of the motor.

Figure 8:
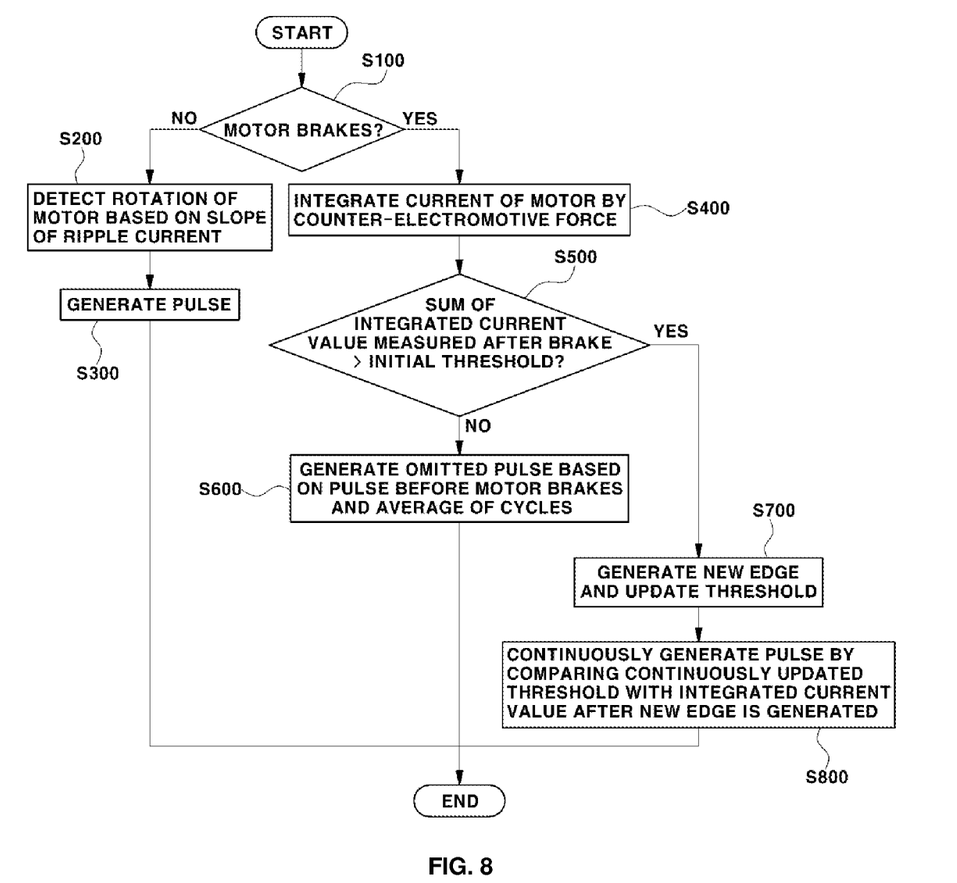
FIG. 8 is a flowchart for explaining a method of detecting rotation of a motor according to an embodiment of the present disclosure.

FIG. 8 is a flowchart for explaining a method of detecting rotation of a motor according to an embodiment of the present disclosure.

Referring to FIG. 8, the logic for determining the rotation amount of the motor may be changed based on the time at which the motor brakes. Whether the motor brakes may be determined by the controller based on a direction in which the motor rotates before the motor brakes and a resistor device in which current flows among resistor devices disposed in an H-bridge of an apparatus for detecting rotation of the motor (S100).

Rotation of the motor may be detected based on a slope of ripple of current flowing in the resistor device until the motor brakes. The controller may generate a pulse according to whether the slope of the current ripple has a positive or negative value based on a reference value when the motor brakes. With reference to the generated pulse, the rotation amount of the motor may be recognized (S200 and S300).

After the motor brakes, the controller may recognize the rotation amount of the motor based on current generated by counter-electromotive force. First, the controller may integrate current of the motor by counter-electromotive force (S400).

The controller may determine whether the cumulative value of the integrated current value that is a value obtained through integration of current is equal to or greater than the initial threshold. Until the cumulative value of the integrated current value is equal to or greater than the initial threshold, the controller may not generate the pulse based on the integrated current value. That is, the pulse may be omitted between the time at which the motor brakes and the time at which the cumulative value of the integrated current value is equal to or greater than the initial threshold (S500).

The controller may infer the omitted pulse based on an average of cycles of pulses before the motor brakes. The controller may infer the pulse in real time based on the average of the cycles of the pulses before the motor brakes from the time at which the motor brakes (S600).

The controller may generate a new edge at the time at which the cumulative value of the integrated current value is equal to or greater than the initial threshold. The controller may set a value, obtained by adding a preset range value to the initial threshold after an edge is generated, to a new threshold. The controller may continuously set the new threshold after the new edge is generated (S700).

The controller may generate an edge while continuously updating the threshold. The controller may continuously generate pulses by comparing the threshold with the sum of integrated current values after the new edge is generated (S800).

According to an embodiment of the present disclosure, the apparatus for detecting rotation of a motor may generate a pulse based on an integrated current value after the motor brakes without a Hall sensor. The rotation amount of the motor may be derived based on the pulse generated by the apparatus for detecting rotation of the motor, thereby reducing manufacturing costs due to omission of a Hall sensor.

According to an embodiment of the present disclosure, the apparatus for detecting rotation of the motor may correct omitted parts of the pulse generated based on the integrated current value based on the pulse derived before the motor brakes. Thus, the apparatus for detecting rotation of the motor may prevent an error in determination of the rotation amount of the motor due to the omitted pulse.

The present disclosure has been described in detail with reference to preferred embodiments thereof. However, it will be appreciated by those skilled in the art that changes may be made in these embodiments without departing from the principles and spirit of the present disclosure, the scope of which is defined in the appended claims and their equivalents.

What is claimed is:

1. An apparatus for detecting rotation of a motor, the apparatus comprising:
   a first switching device and a second switching device that are connected to a power supply;
   a third switching device and a fourth switching device that are connected to a ground;
   the motor connected between a first node to which the first switching device and the third switching device are connected and a second node to which the second switching device and the fourth switching device are connected;
   a first resistor device and a second resistor device that are disposed between the third switching device and the ground and between the fourth switching device and the ground, respectively; and
   a controller configured to derive a rotation amount of the motor through integration of current flowing in the first resistor device or the second resistor device by counter-electromotive force generated when the motor brakes, and to generate a pulse based on the rotation amount of the motor,
   wherein:
   current flows in the second resistor device when the motor rotates in a forward direction;
   current flows in the first resistor device when the motor rotates in a reverse direction;
   when the motor brakes while rotating in the forward direction, the controller generates the pulse based on the current flowing in the first resistor device; and
   when the motor brakes while rotating in the reverse direction, the controller generates the pulse based on the current flowing in the second resistor device.

2. The apparatus of claim 1, wherein the controller detects rotation of the motor until the motor brakes based on a slope of ripple of the current flowing in the first resistor device or the second resistor device.

3. The apparatus of claim 2, wherein the controller corrects omission of a pulse generated until an integrated value of the current flowing in the first resistor device or the second resistor device, accumulated from a time at which the motor brakes, is equal to or greater than an initial threshold.

4. The apparatus of claim 3, wherein the controller generates the omitted pulse based on an average of cycles of pulses until the motor brakes.

5. The apparatus of claim 1, wherein the controller generates an edge of the pulse at a time at which a cumulative value of integrated current value obtained through integration of current is equal to or greater than an initial threshold.

6. The apparatus of claim 5, wherein:
the controller sets a value obtained by adding a preset range value to the initial threshold after the cumulative value of the integrated current value is greater than the initial threshold, to a primary threshold; and
the controller generates an edge of the pulse at a time at which the cumulative value of the integrated current value is equal to or greater than the primary threshold after the edge of the pulse is generated.

7. The apparatus of claim 6, wherein:
the controller sets a value obtained by adding the range value to the primary threshold, to a secondary threshold after the edge of the pulse is generated, and generates the edge of the pulse by comparing the secondary threshold with the cumulative value of the integrated current value; and
the controller generates the edge of the pulse by comparing a new threshold that is continuously updated with the cumulative value of the integrated current value.

8. The apparatus of claim 1, wherein the controller comprises:
a current measurer configured to measure the current flowing in the first resistor device or the second resistor device;
an integral unit configured to derive the rotation amount of the motor, which is proportional to an integrated current value obtained through integration of the measured current;
a correction logic generator configured to correct omission of a pulse generated until a cumulative value of the integrated current value is equal to or greater than an initial threshold from a time at which the motor brakes; and
a pulse generator configured to generate the pulse by comparing the cumulative value of the integrated current value with an Nth threshold.

9. The apparatus of claim 8, wherein the pulse generator sets a value obtained by adding a preset range value to an $(N-1)^{th}$ threshold, to an $N^{th}$ threshold, and generates a new edge of the pulse at a time at which the integrated current value accumulated after the edge of the pulse is generated is equal to or greater than the $N^{th}$ threshold.

10. The apparatus of claim 8, wherein the current measurer derives a rotation direction before the motor brakes based on a resistor device in which current flows among the first resistor device and the second resistor device.

* * * * *